April 2, 1935.    F. G. SKEYHAN    1,996,529
BELT SPLICE
Filed May 16, 1934
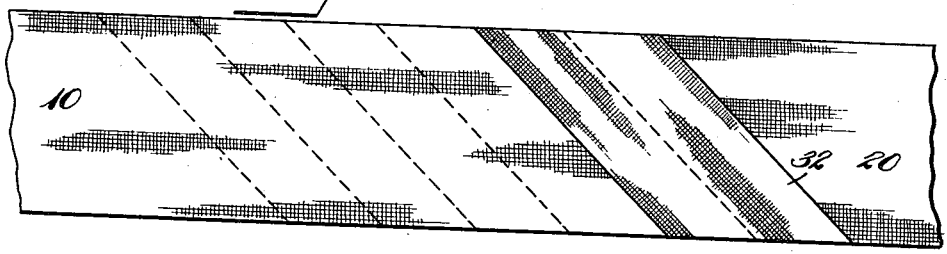
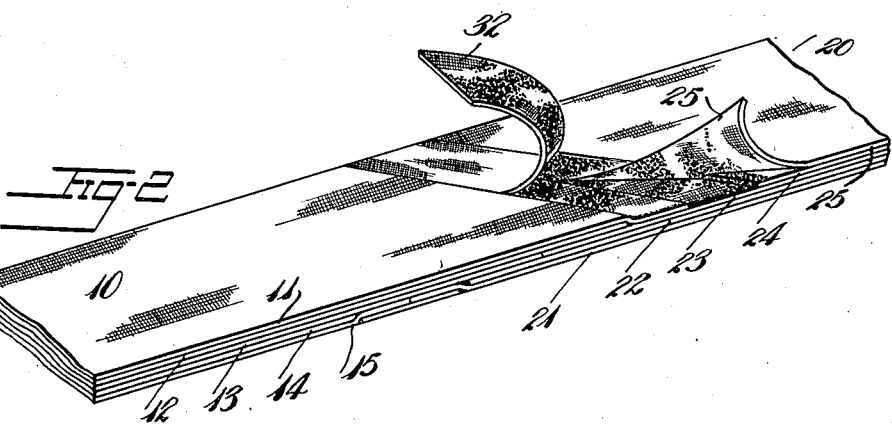
Inventor
Fred G. Skeyhan
By Eakin & Avery
Attys.

Patented Apr. 2, 1935

1,996,529

UNITED STATES PATENT OFFICE 1,996,529

BELT SPLICE

Fred G. Skeyhan, Akron, Ohio, assignor to The B. F. Goodrich Company, New York, N. Y., a corporation of New York Application May 16, 1934, Serial No. 725,928

5 Claims. (Cl. 24—38)

This invention relates to belt splices and to methods of making same, and it is especially useful in the art of splicing laminated belts such as those made of plies of rubber and fabric.

The principal objects of the invention are to provide flexibility, strength and freedom from separation of the plies at the splice.

Other objects will appear from the following description and the accompanying drawing.

Of the drawing:

Fig. 1 is a plan view of the preferred form of splice as applied to a belt.

Fig. 2 is a perspective view of the same with parts partially removed to show the construction of the splice.

Fig. 3 is an edge view of the splice in its preferred form.

Referring to the drawing, the numeral 10 designates a belt portion comprising superimposed plies 11, 12, 13, 14, and 15 of sheet material, and the numeral 20 designates a portion of similar belt material comprising superimposed plies 21, 22, 23, 24, and 25.

In order to provide a splice according to this invention the successive plies of sheet material are cut away at the meeting ends of the belt portions to provide a pair of mating stepped scarfs of any desired construction which will provide a structure in which the outer layers or plies of the respective belt portions are depressed below the surface of the belt over an area adjacent their meeting edges to provide a recess to be filled by a reinforcing element.

In the preferred form of splice this is accomplished by stepping back plies 11, 12, and 13 of one belt portion and plies 21, 22, and 23 of the other belt portion in equal steps. Then plies 14 and 24 are stepped back approximately twice the length of the steps in the other plies and plies 15 and 25 are allowed to extend over plies 14 and 24 by the length of a normal step. All of the ends of the plies are preferably cut at 45 degrees to the edge of the belt to distribute the joints along the direction of travel of the belt to avoid vibration.

The two belt portions are then assembled as shown in the drawing, a layer 30 of cement or sheet rubber composition being applied between the scarfed surfaces to unite the surfaces of the material. Reinforcing plies 31 and 32 of flexible material are applied over the depressed areas where the outer plies of the belt portions meet.

Preferably the reinforcing elements 31 and 32 are more extensible and flexible than the plies of the belt. In the preferred form of the invention these reinforcements comprise layers of square woven fabric having their warp and weft threads extending diagonally with respect to the length of the belt and layers of rubber composition 33 and 34 are applied under the reinforcements so that the reinforcements are embedded therein.

As the outer plies 11 and 25 and 15 and 21, which normally carry the greatest tension during flexing of the belt, terminate below the surface of the belt and the splice, the tendency for the ends of these plies to lift or peel from the remaining structure when the belt passes over a pulley is greatly reduced or practically eliminated. The reinforcing plies 31 and 32, by overlapping the ends of these outer plies, effectively bind the ends of the outer plies together, whereas, by having the threads of these reinforcements diagonally of the belt and their ends substantially free from tension, tendency of the reinforcing elements to peel is avoided.

As the plies comprising the belt are ordinarily made of rubberized fabric and the adhesive sheet material or cement layers 30, 33, and 34 are of rubber material, the splice is completed by clamping it between heated platens and vulcanizing the splice so formed while under pressure.

I claim:

1. A belt splice comprising a pair of laminated belt portions united along a scarfed joint, the ends of the plies at the belt faces being wholly depressed below the surface of the belt at the splice.

2. A belt splice comprising a pair of laminated belt portions united along a scarfed joint, the ends of the plies at the belt faces being wholly depressed below the surface of the belt, and a filler element disposed over the abutting ends of the face plies within the depressed area.

3. A belt splice as defined in claim 2 in which the said filler element is stretchable longitudinally of the belt.

4. A belt splice comprising a pair of laminated belt portions united along a scarfed joint, the abutting ends of the plies at the belt faces being depressed below the surface of the belt, and a reinforcing element of square woven fabric applied over the abutting ends of the face plies within the depressed area, the threads of the fabric diagonally crossing the face of the belt and the belt being of the same thickness at the splice as elsewhere.

5. A belt splice comprising a pair of laminated belt portions, each portion having its plies stepped to provide a scarfed joint and each of its face plies extending past the end of the adjacent inner ply whereby the ends of each face ply are wholly depressed below a surface of the belt, and reinforcing elements applied over the depressed ends of the face plies and filling the depression thereover.

FRED G. SKEYHAN.